March 4, 1969   L. A. CHAVIS   3,430,615

ELECTRONIC SPEED CONTROL DEVICE FOR AN ENGINE

Filed Jan. 24, 1967

INVENTOR.
Leon A. Chavis
BY
WILSON, SETTLE, BATCHELDER &
CRAIG
ATT'YS.

United States Patent Office 3,430,615
Patented Mar. 4, 1969

3,430,615
ELECTRONIC SPEED CONTROL DEVICE FOR AN ENGINE
Leon A. Chavis, Detroit, Mich., assignor to Mallory Electric Corporation, Detroit, Mich., a corporation of Michigan
Filed Jan. 24, 1967, Ser. No. 611,323
U.S. Cl. 123—102               11 Claims
Int. Cl. F02p *11/06*

ABSTRACT OF THE DISCLOSURE

The present invention is a control device in the form of a limit switch circuit for limiting the speed at which an engine may be driven. The limit switch circuit operates on pulses fed to it from the ignition coil and condenser of the engine's ignition system and converts those pulses to a square-wave signal. The limit switch circuit includes a relay operated by the square-wave signal when the average of the signal exceeds a threshold value equivalent to the desired maximum speed of the engine. When the relay operates, it connects the ignition coil and condenser combination to a point of reference potential to thereby reduce the level of the ignition pulses to stop ignition. The limit switch circuit also includes a one-shot circuit comprised of a pair of transistors cross-coupled by a capacitor and operable to convert the input pulses into the square-wave signal.

Background of the invention

In certain types of internal combustion engines, for example marine engines and high performance automobile racing engines, the engine may sometimes be driven at a rate high enough to damage either the engine or associated structures. A relatively simple, reliable means has been sought for limiting the speed at which an engine may be driven. The present invention provides an electronic control device for the purpose.

Summary of the invention

The control device is a limit switch circuit, as previously mentioned, which operates in conjunction with the ignition system for the engine. The limit switch circuit includes switching means operative in its actuated condition to reduce the level of the ignition pulses and thereby stop ignition of the engine, and a one-shot circuit receiving pulses proportional to the speed of the engine and converting those pulses into a square-wave signal which operates the switching means. The one-shot circuit may include a pair of transistors cross-connected so as to operate each other and responsive to the pulse input to provide the square-wave signal which operates the switching means when the average level of the signal exceeds a threshold equivalent to the maximum safe speed of the engine.

Accordingly, it is an object of the invention to provide a speed control for an engine.

Another object of the invention is to provide an electronic speed control which will temporarily discontinue operation of an internal combustion engine when the engine speed rises above a maximum safe value.

A further object of the invention is to provide such a control device which is operated directly by pulses generated by the ignition system of the engine.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
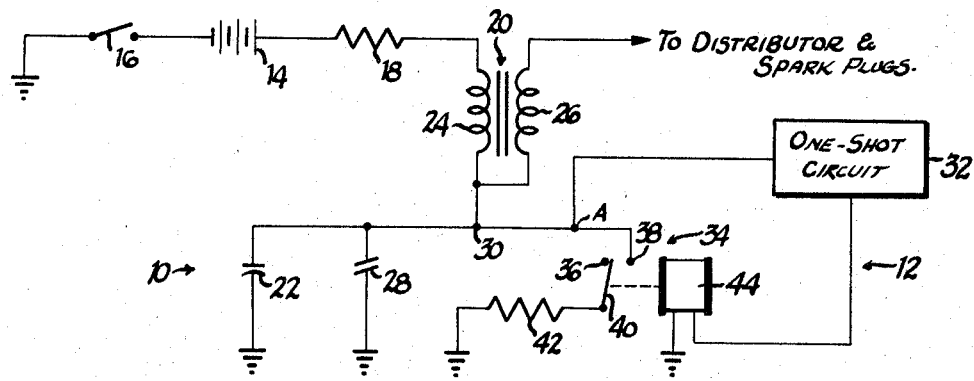
FIGURE 1 is a schematic diagram showing an ignition system for an engine provided with a speed control in accordance with the invention.

As shown on the drawings:

In FIGURE 1 there is shown an ignition system 10 for an internal combustion engine, and a speed control device 12 to limit the speed of the engine to a maximum safe speed level. The ignition system 10 includes the usual twelve volt battery 14 of the vehicle in which the ignition system is provided, and an ignition switch 16 for making and breaking the ignition circuit. The ignition system also includes a resistor 18, an ignition coil 20 and a capacitor 22 all connected in series with each other and with the battery 14. The ignition 20 has a primary winding 24 connected at opposite ends thereof to the resistor 18 and to the condenser 22, and a secondary winding 26 connected at one end to the condenser 22 and connected at the other end thereof to the distributor (not shown) which in turn is connected to the engine's sparkplugs (not shown). The breaker points 28 of the ignition system are connected across the condenser 22, and both the condenser 22 and the breaker points 28 are connected at one side thereof to a point of reference potential which may be ground.

The ignition system 10 operates in the conventional manner. That is, when the ignition switch 16 is closed, and the breaker points 28 are open, current flows through the primary winding 24 and the condenser 22, and a field builds up in the primary winding 24. When the breaker points 28 close, one end of the coil 20 is grounded, and the field in the ignition coil 20 collapses very rapidly. This decreasing field induces a high voltage in the secondary winding 26 of the coil 20, and the latter voltage is fed via the distributor to a sparkplug causing it to fire. This cycle is repeated as the breaker points 28 open and close at a rate in proporation to the speed of the engine so that high voltage pulses are supplied to the distributor also at a rate in proportion to the speed of the engine.

The speed control device 12 of the invention is coupled to the junction 30 between the ignition coil 20 and the condenser 22. Appearing at the junction 30 are pulses having a repetition rate proportional to the speed of the engine. These pulses are fed to a one-shot circuit 32 which converts these pulses to a square-wave signal which is applied by the circuit 32 to a relay 34. The relay 34 has fixed contacts 36 and 38 and a movable contact 40. The fixed contact 38 is connected to the junction 30 and the movable contact is connected by a resistor 42 to a point of reference potential. The movable contact 40 is normally open, and when the actuator 44 of the relay 34 is energized by the one-shot circuit 32, the relay contacts 40 and 38 close to connect the junction 30 to ground through the resistor 42. The resistor 42 prevents full decay of the ignition coil 20 and thus reduces the level of the sparking voltage produced in the secondary winding 26. This reduction in the sparking voltage is sufficient to discontinue ignition of the engine. The relay actuator 44 is energized when the average level of the square-wave signal supplied to the actuator 44 exceeds a threshold level which is equivalent to the maximum safe speed of the engine. Therefore, the sparking pulses are not reduced until the maximum safe speed of the engine is exceeded.

Figure 2:
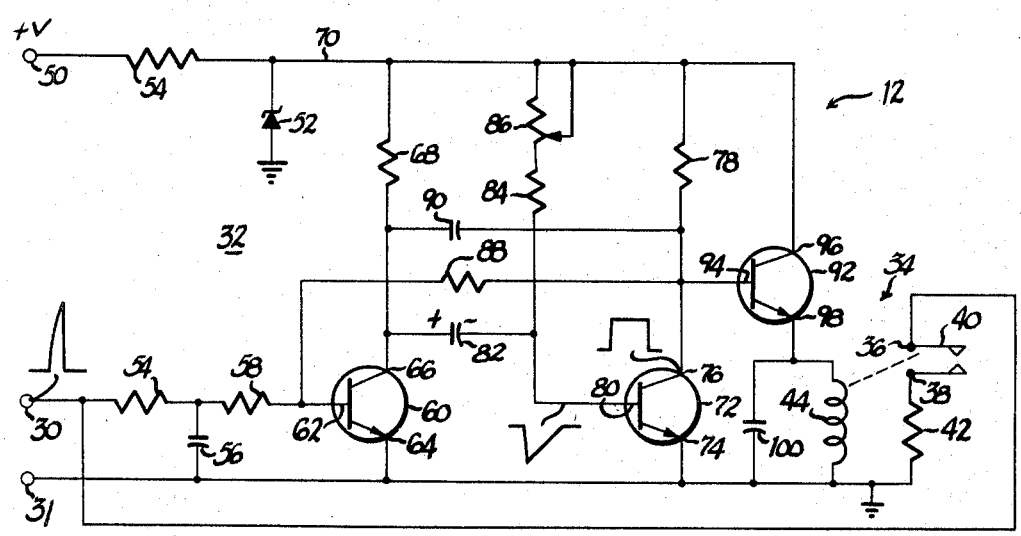
FIGURE 2 is a schematic circuit diagram for the speed control device of FIGURE 1.

FIGURE 2 is a schematic circuit diagram for the one-shot circuit 32 and the switching means 34 which together make up a limit switch circuit in accordance with the invention. The input terminals for the limit switch circuit are at 30 and 31, terminal 31 being connected to a point of reference potential which may be ground. Positive battery voltage is applied to supply terminal 50, and this voltage is regulated by a Zener diode 52, one side of which is grounded. The other side of diode 52 is connected to a resistor 54 which serves as a current limiting resistor for the diode.

Connected to input terminal 30, is a filter formed by a resistor 54 and a capacitor 56, one side of the capacitor being connected to ground and the other side being connected to the resistor 54. The filter formed by these two components removes any oscillations from the input voltage. The input circuit portion for the limit switch circuit 32 also includes a resistor 58 which is connected at one end to resistor 54 and at the other end to the base 62 of a transistor 60. The transistor 60 is connected in the common emitter configuration, the emitter 64 of the transistor being grounded, and the collector 66 of the transistor being connected by a load resistor 68 to the potential supply line 70.

The one-shot circuit 32 also includes a second transistor 72 which has its emitter 74 grounded and its collector 76 connected via a load resistor 78 to the potential supply line 70. The base 80 of transistor 72 is coupled by a capacitor 82 to the collector 66 of transistor 60. Also connected to the base 80 of transistor 72 are two resistors 84 and 86, resistor 86 being connected at one end to the potential supply line 70. Resistor 86 is variable to allow adjustment of the pulse width as will be explained further hereinafter.

The collector 76 of transistor 72 is connected by a resistor 88 to the base 62 of transistor 60. A capacitor 90 is connected to the collector 66 of transistor 60 and also to the collector 76 of transistor 72. Resistor 88 and capacitor 90 form a regenerative network which feeds back part of the output signal from transistor 72 to the base of transistor 60.

A third transistor 92 is provided in the limit switch circuit, and this transistor forms a part of the switching means 34 at the output of the limit switch circuit. Transistor 92 has its base 94 connected to the collector 76 of transistor 72. The collector 96 of transistor 92 is connected to the potential supply line 80, and the emitter 98 of transistor 92 is connected to one end of the relay coil 44. A capacitor 100 is connected across relay coil 44 and serves to average the signal applied to it. Transistor 92 is connected in the common collector configuration (as an emitter follower) and serves as an amplifying switch which translates and amplifies the signal appearing at the collector 76 of transistor 72.

The description of operation of the limit switch circuit of FIGURE 2 will commence with the circuit in its quiescent condition just before an input pulse is applied to the terminals 30 and 31. In this condition, transistor 72 is biased for conduction, and a voltage just above ground potential appears at the collector 76 of transistor 72. This voltage is applied to the base 62 of transistor 60 via the resistor 88, so the base 62 of transistor 60 is not sufficiently positive to turn transistor 60 on. Transistor 92 is also in its off condition. Due to the conduction of transistor 72, the capacitor 82 is charged up to the polarity indicated in FIGURE 2.

When a positive spike pulse is applied across the input terminals 30 and 31, filter 54, 56 removes any oscillations from the pulse and applies the pulse to the base 62 of transistor 60. The pulse turns transistor 60 on, and its collector 66 goes to a potential just above ground potential. The voltage across the capacitor 82 suddenly goes negative, and the capacitor begins to discharge through the conducting transistor 60. The voltage on capacitor 82 turns off the transistor 72 and causes its collector 76 to go positive, thus turning on transistor 92. The positive voltage appearing at the collector 76 of transistor 72 is also applied via resistor 88 to the base 62 of transistor 60, and holds that transistor on even after the input pulse has terminated. When capacitor 82 has fully discharged, the base 80 of transistor 72 is again made positive and transistor 72 begins to conduct again. The collector 76 of transistor 72 then goes negative nearly to ground potential, and this potential is again applied by resistor 88 to the base 62 of transistor 60 turning that transistor off. Transistor 92 is also turned off and remains off so long as the near-ground potential remains at the collector 76 and transistor 72.

Thus, the positive spike appearing at input terminal 30 is converted to a square-wave signal at the collector 76 of transistor 72, and the latter signal is applied by the emitter follower transistor 92 to the relay coil 44. The capacitor 100 averages the square-wave signal and applies the average level signal to the coil 44. When this average signal exceeds a predetermined value, the relay coil 44 pulls in its contact 40 and thus closes contacts 36 and 38. As previously mentioned, this connects resistor 42 to the junction 30 between the ignition coil 20 and the ignition condenser 22 and reduces the sparking voltage to a level where ignition no longer takes place.

Figure 3:
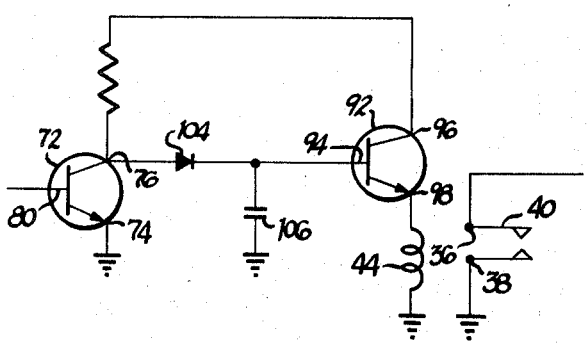
FIGURE 3 is a schematic diagram of a modification of the circuit of FIGURE 2.

FIGURE 3 shows a slight modification of the output portion of the limit switch circuit of FIGURE 2. Transistors 60 and 72 are connected as shown in FIGURE 2, but transistor 92 is connected somewhat differently. A diode 104 is connected between the collector 76 of transistor 72 and the base 94 of transistor 92. An averaging capacitor 106 is connected between the cathode of diode 104 and ground. The coil 44 is connected between the emitter 98 of transistor 92 and ground. It may be noted that no resistor equivalent to resistor 42 is provided in series with the contacts 36 and 38. With this modified circuitry, the square-wave signal which appears at the collector 76 of transistor 72 is converted to an average level signal by the averaging capacitor 106. The latter signal is amplified by transistor 92 and is applied to the relay coil 44. As before, when the average level signal exceeds a predetermined threshold value, the relay 44 pulls in the movable contact 40 to close contacts 40 and 38. This grounds the junction 30 between the ignition coil 20 and the ignition condenser 22 and thus reduces the value of the ignition pulses to stop ignition.

Referring again to FIGURE 2, the resistor 86 is made variable to allow the time constant of the resistance-capacitance network formed by resistors 84 and 86 and the capacitor 82 to be varied. If the resistance of resistor 84 is increased, the width of the square-wave pulse supplied by the one-shot circuit is increased, and consequently the relay 44 pulls in at a lower value of revolutions per minute. If the resistance of resistor 86 is decreased, the pulse width is narrowed, and the relay pulls in at a higher value of revolutions per minute. Thus, the circuit is readily adjustable to permit convenient setting of the maximum safe engine speed beyond which the circuit stops ignition.

From the foregoing description, it is evident that the invention provides an electronic speed control device which will temporarily discontinue operation of an internal combustion engine when the engine's speed rises above a maximum safe value. The limit switch circuit of the device is straightforward and relatively uncomplicated and will operate reliably when installed in an automotive vehicle. The device may be operated directly by the pulses generated by the ignition system of the engine, although a separate pulse source could be provided if desired.

Having thus described my invention, I claim:

1. In an ignition system for an internal combustion engine having pulse producing means for supplying high voltage pulses to the sparkplugs of the engine at a rate proportional to the speed of the engine, a limit switch circuit for limiting the speed of the engine by reducing the level of said pulses to stop ignition when a maximum safe engine speed is exceeded, said limit switch circuit including in combination switching means to be coupled to said pulse producing means operative in an actuated condition thereof to reduce the level of said pulses to stop ignition of the engine, a one-shot circuit coupled to said switching means for actuating said switching means, and means for coupling said one-shot circuit to said pulse producing means for supplying to said one-shot circuit pulses at a rate proportional to the speed of the engine, said one-shot circuit comprising a pair of transistors cross-coupled by means including a capacitor for translating said pulses to a square-wave signal, and an output circuit portion connected between said transistors and said switching means for averaging said square-wave signal and applying the averaged signal to said switching means, said switching means being actuated when the average signal exceeds a predetermined threshold level equivalent to the maximum safe speed of said engine.

2. The limit switch circuit as claimed in claim 1 in which said pulse producing means comprises an ignition coil and condenser actuated by breaker means.

3. The limit switch circuit of claim 2 in which said switching means comprises a relay.

4. The limit switch circuit of claim 2 in which said relay has normally open contacts for connecting said ignition coil and condenser to a point of reference potential, and an actuator responsive to said square-wave signal to close said contacts when the average level of said signal exceeds said threshold level.

5. The limit switch circuit of claim 1 in which each of said transistors has an input portion and an output portion, and in which said one-shot circuit further includes means coupling said input portion of said first transistor to said coupling means, means including said capacitor coupling the input portion of said second transistor to the output portion of said first transistor, and means connecting the output portion of said second transistor to said output circuit portion.

6. In an ignition system for an internal combustion engine having an ignition coil and condenser for supplying high voltage pulses to the sparkplugs of the engine at a rate proportional to the speed of the engine, a limit switch circuit for limiting the speed of the engine by reducing the level of said pulses to stop ignition when a maximum safe engine speed is exceeded, said limit switch circuit including in combination a relay having normally open contacts connected to the coil and condenser combination of said ignition system, means for connecting said contacts to a point of reference potential so that when said contacts close said high voltage pulses are reduced to stop ignition of the engine, said relay further having an actuator for said contacts, a one-shot circuit coupled to said actuator, and means for coupling said one-shot circuit to a source of pulses having a pulse repetition rate proportional to the speed of the engine, said one-shot circuit comprising first and second transistors each having input and output portions, means connecting the input portion of said first transistor to said coupling means, means including a capacitor coupling the input portion of said second transistor to the output portion of said first transistor, means for supplying operating potential to said transistors, and utilization means coupled to the output portion of said second transistor including the actuator of said relay, said capacitor serving to control the conduction of said second transistor to produce a square-wave signal at the output portion thereof in response to the pulses supplied to the input portion of said first transistor, and said actuator responding to said square-wave signal to close said contacts when the average of said signal exceeds a predetermined threshold level equivalent to the maximum safe speed of said engine.

7. The limit switch circuit as claimed in claim 6 in which said source of pulses is the ignition coil and condenser combination of said ignition system.

8. The limit switch circuit as claimed in claim 7 in which said utilization means includes a third transistor having an input portion coupled to the output portion of said second transistor and an output portion coupled to said actuator of said relay, said third transistor acting as an amplifying switch driving said relay actuator.

9. The limit switch circuit as claimed in claim 6 in which said one-shot circuit further includes resistive means coupling the output portion of said second transistor back to the input portion of said first transistor.

10. In an ignition system for an internal combustion engine having pulse producing means for supplying high voltage pulses to the spark plugs of the engine at a rate proportional to the speed of the engine, a limit switch circuit for limiting the speed of the engine by reducing the level of said pulses to stop ignition when a maximum safe engine speed is exceeded, said limit switch circuit including in combination a relay having normally open contacts to be connected to said pulse producing means, means connecting said contacts to a point of reference potential so that when said contacts close said high voltage pulses are reduced to stop ignition of the engine, said relay further having an actuator for said contacts, and circuit means to be connected between said pulse producing means and said relay actuator for translating pulses from said pulse producing means to increase the pulse width thereof and provide an average signal, said actuator responding to the average signal to close said contacts when the average signal exceeds a predetermined threshold level equivalent to the maximum safe speed of the engine.

11. In an ignition system for an internal combustion engine having pulse producing means for supplying high voltage pulses to the spark plugs of the engine at a rate proportional to the speed of the engine, a limit switch circuit for limiting the speed of the engine to a maximum safe engine speed, said limit switch circuit including in combination switching means to be coupled to said pulse producing means operative in an actuated condition thereof to reduce the level of said pulses to stop ignition of the engine, circuit means coupled to said switching means for translating pulses supplied from said pulse producing means to increase the pulse width thereof and provide an average signal, said switching means responding to the average signal to reduce the ignition pulses when the average signal exceeds a predetermined threshold level equivalent to the maximum safe speed of the engine.

References Cited

UNITED STATES PATENTS 3,070,185  12/1962  Fales              123—102 X
3,153,746  10/1964  Atkinson         317—5

WENDELL E. BURNS, *Primary Examiner.*

U.S. Cl. X.R.

123—117, 118, 148, 198; 317—5, 148.5